Figure 1:
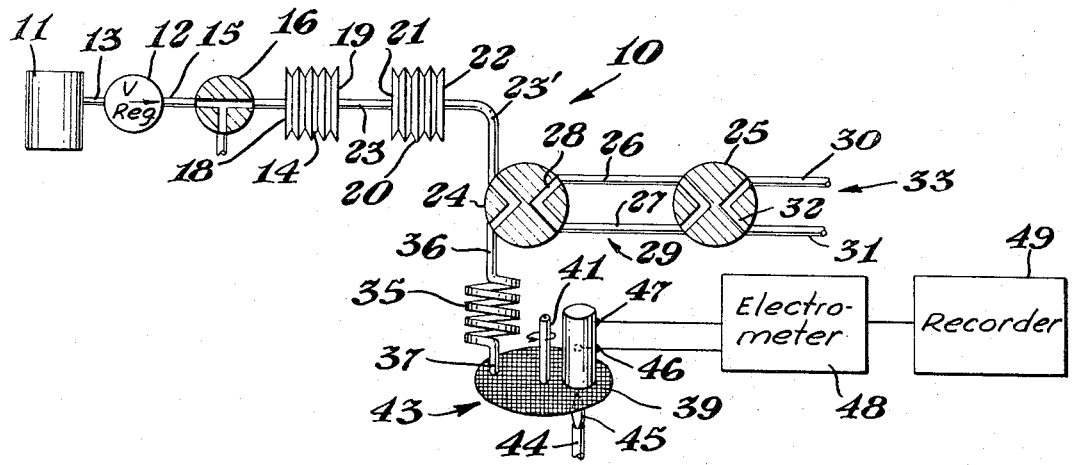

April 9, 1968  E. G. OWENS II, ET AL  3,376,694
METHOD AND APPARATUS FOR GEL PERMEATION CHROMATOGRAPHY
Filed July 22, 1966  3 Sheets-Sheet 1

INVENTORS.
E. Guy Owens II
Harold H. Gill
William E. Hatton
John G. Cobler
BY
AGENT April 9, 1968 E. G. OWENS II, ET AL 3,376,694
METHOD AND APPARATUS FOR GEL PERMEATION CHROMATOGRAPHY
Filed July 22, 1966 3 Sheets-Sheet 3

INVENTORS.
E. Guy Owens II
Harold H. Gill
William E. Hatton
John G. Cobler
BY
AGENT

United States Patent Office 3,376,694
Patented Apr. 9, 1968

3,376,694
METHOD AND APPARATUS FOR GEL
PERMEATION CHROMATOGRAPHY
Elbert Guy Owens II, Harold H. Gill, William E. Hatton, and John G. Cobler, Midland, Mich., assignors to The Dow Chemical Company, Midland, Mich., a corporation of Delaware
Filed July 22, 1966, Ser. No. 567,107
18 Claims. (Cl. 55—67)

This invention relates to an improved method and apparatus for gel permeation chromatography, and more particularly relates to an improved method and apparatus for gel permeation chromatography using relatively small quantities of materials.

Gel permeation chromatography is a process whereby a solution of a non-volatile organic or organic polymeric material or high molecular weight substances are passed through an elongate column of a microporous, insoluble, resinous material and the effluent from the column examined for the presence of the polymeric material. In general, the length of time required for various fractions of the soluble non-volatile material to appear in the effluent is an indication of molecular weight or molecular size. One such procedure for gel phase permeation chromatography, may be found in the Journal of Chromatography, March 1966, pages 89–92, in an article entitled, "A Liquid Chromatographic System for the Analysis of Macromolecules," by Stouffer, Oakes and Schlatter. It would be beneficial if solutions of polymers could be analyzed in a relatively short length of time to provide a substantial uniform result generally independent of minor mechanical deviation. Oftentimes, the effluent from a gel phase chromatography column is transferred to a flame ionization detection system by means of a chain or spiral wire. Certain mechanical and physical problems occur in using the chain or spiral wire in that the tension adjustment is extremely critical and in practice. It is difficult to adjust the chain or wire to a uniform tension in order that it is not slack during some portion of the cycle. Further, the surface area of chain or spiral wire is relatively low and the quantity of effluent is limited thereby. Preignition or flashback of a flammable polymer or solvent along a chain is oftentimes undesirable and leads to erroneous results. Oftentimes, employing a chain or wire, it is mechanically difficult to transfer effluent from the column to the chain or wire. If such a transfer is done dropwise, occasionally some drops miss the narrow chain through mechanical variations or tend to overload the chain.

Furthermore, it would be desirable if a method and apparatus were available which provided greater separation between adjacent fractions within a column, that is, higher resolution in a gel permeation chromatographic determination employing a column of given length.

It would also be advantageous if there were available an improved method and apparatus for the rapid gel permeation chromatographic analysis of polymeric samples.

These benefits and other advantages in accordance with the present invention are achived in a gel permeation chromatographic method wherein a high molecular weight material to be analyzed is dissolved in a solvent to form a solution, the solution passed through an elongate body of microporous polymer which is insoluble in the solution, subsequently fractions of the solution are removed from the elongate body and the quantity of material present within the solvent determined, the improvement which comprises employing an elongate-body having an inside diameter of from about 0.01 inch to 0.125 inch containing a microporous polymer, depositing effluent from the body upon a perforate inert metal support capable of retaining solvent and the high molecular weight material, evaporating a major portion of the solvent from the support, passing the portion of the support upon which the solvent is deposited into a flame of a flame ionization detector and recording the response of the detector.

Also contemplated within the scope of the present invention is an improved gel permeation chromatographic apparatus comprising means to provide an effluent from a gel permeation chromatographic column having an inside diameter of from about 0.01 inch to about 0.125 inch, a perforate inert metal body having perforations of sufficient size to retain a drop of liquid thereon, means to provide a flame disposed adjacent the perforate metal body, and means to detect combustion products of a non-volatile material deposited upon the perforate body disposed adjacent the flame.

Further features and advantages of the present invention will become more apparent from the following specification taken in connection with the drawing wherein:

FIGURE 1 schematically depicts the apparatus of the invention.

FIGURES 2–7 depict experimental results.

In FIGURE 1 there is schematically illustrated a gel phase permeation chromatographic analyzing unit generally designated by the reference numeral 10. The unit 10 comprises in cooperative combination a compressed gas supply 11. The compressed supply 11 is in operative communication with a pressure controller 12 by means of a conduit 13. The output of the pressure control 12 is in operative communication with a first bellows 14 by means of a conduit 15 having disposed therein a three-way valve 16. The first bellows 14 has a first or fixed end 18 and a second or moveable end 19. Adjacent the first bellows 14 is a second bellows 20. The second bellows 20 has a first or moveable end 21 and a second or fixed end 22. A rigid connecting means 23 secures the movable ends 19 and 21 of the first and second bellows 14 and 20, respectively, in fixed relationship to each other. A conduit 23' is in operative communication with the interior of the second bellows 20. The conduit 23' terminates remote from the bellows 20 in a four-way valve 24. A second four-way valve 25 is disposed generally adjacent the four-way valve 24 and is in operative communication therewith by means of conduits 26 and 27. The conduits 26 and 27 and a passage 28 within the four-way valve 24 form a sample loop generally designated by the reference numeral 29. The four-way 25 has in operative communication therewith a first conduit 30 and a second conduit 31. The conduits 30 and 31 in combination with a passage 32 joining the conduits 30 and 31 form a sample flushing loop generally indicated by the reference numeral 33. A gel permeation chromatographic column 35 is in operative comunication with a port of the four-way valve 24. The column 35 has a first or inlet end 36 and a second or discharge end 37. The column 36 comprises a hollow tubular member having an inside diameter of from about 0.01 to 0.125 inch packed with a particulate microporous resin. The second end 37 of the column 35 is the discharge end of the column 35. The discharge end of the column 35 is disposed adjacent a moveable perforate metal body 39 such as a platinum screen which is sufficiently fine that solvent deposited from the discharge or second end 37 of the column 35 is maintained on the screen by surface tension. The perforate metal element 39 has a generally discoidal configuration and is supported at the center thereof by an electrically insulating drive or rotating means 41 adapted to rotate the perforate metal element at a predetermined rate. Spaced at the second end 37 of the column 35 is a flame ionization detection assembly 43. The detector assembly 43 comprises means 44 to provide a flame 45, a first electrode 46 and a second electrode 47. Operatively connected to the first and second electrodes 46 and 47 is an electrometer amplifier 48. The output of the electrometer amplifier 48 is in operative communication with a recorder 49 which records the ionization occurring between the electrodes 46 and 47.

In operation of the apparatus as depicted in FIGURE 1, a suitable packed column is provided and the second bellows 22 filled with a desired purified solvent. A valve 24 is positioned in such a manner as to connect a bellows to the column and the pressure in the first bellows 14 is maintained at atmospheric pressure. The three-way valve 16 is closed. A predetermined gas pressure is applied to the bellows 14. A pressure within the first bellows 14 is transmitted to the second bellows 20 forcing the solvent from the second bellows 20 through the column. The flow rate is measured by suitable volumetric or gravimetric means. If necessary, both the four-way valves 24 and 25 are each rotated 90° to connect the conduit 30 with the bellows 22 and a desired amount of solvent added to the bellows by reducing the pressure on the first bellows 14 by opening the three-way valve 16. The conduit 31 is closed during such an operation by means not shown. The four-way valve 24 is returned to the position depicted in FIGURE 1 and a solution of desired polymer introduced into the sample loop 29. Sufficient solution is provided to remove solvent therefrom. The second valve 25 is rotated into the position shown in FIGURE 1 wherein the sample loop 29 contains a predetermined quantity of the solution to be passed through the column or any fraction of the material in the loop. Rotation of the first valve 24 by 90° provides a fluid path from the second bellows 20 through the conduit 23' through the valve 24 through the conduit 26 through the second valve 25 to the conduit 27 through the passage 28 through the valve 24 and into the first end of the column 26 providing a predetermined volume of sample solution which is subsequently forced through the column by the application of air pressure to the first bellows 14 causing the second bellows 20 to be compressed. The effluent from the second end of the column beneficially is deposited in the form of a plurality of drops on the perforate member 39 wherein the volatile solvent evaporates from the screen leaving a non-volatile component thereon. Such evaporation beneficially occurs in the peripheral region of the perforate region 39 lying between the second end 37 of the column and the flame detector assembly 43. Residual portions of the non-volatile material in the solvent droplets on reaching the flame supply means 44 are pyrolyzed and detected by the increased ionization in the gas space between the electrodes 46 and 47. The signal from the electrodes 46 and 47 is subsequently amplified in the electrometer 48 and recorded by the recorder 49. Thus, by employing a dropwise discharge from the second end 37 of the column 35, the recorded trace is a plurality of spikes which may be considered equivalent to a bar graph showing the distribution of non-volatile material within the effluent versus time.

It is critical and essential in the practice of the present invention that the inside dimension of the gel permeation chromatographic column or elongate body be from about 0.01 inch to about 0.125 inch and beneficially within the range of from about 0.01 to 0.08 inch. When the diameter of the column is below about 0.01 inch, packing of the column is difficult and is often non-uniform. Also, the flow rate becomes insufficient to provide a sufficient quantity of material for the detector to provide adequate indication of its presence. Columns having an inside diameter greater than about 0.125 inch are undesirable in that poor resolution is frequently obtained, greater column lengths are required and the time for analysis becomes excessive. Rapid analysis with excellent resolution is obtained when using columns having inside diameters of 0.01 inch to about 0.08 inch. When columns having inside diameters within this range are employed, very rapid, high resolution separation is obtained. When columns are employed utilizing diameters from about 0.01 inch to about 0.02 inch oftentimes it is beneficial to provide an additional flow of solvent over the discharge end of the column adjacent the detector assembly in order to provide an adequate volume of solvent to form drops and transfer the effluent to the perforate metal element. If an auxiliary scavenging stream is not utilized with low flow rates, drop formation may be erratic or non-existent. Such an auxiliary flow beneficially is applied immediately above the discharge end of the column wherein the solvent may be carried by the force of gravity to the opening and dilute the effluent.

The invention is further illustrated but not limited by the following examples.

*Example 1*

Figure 2:
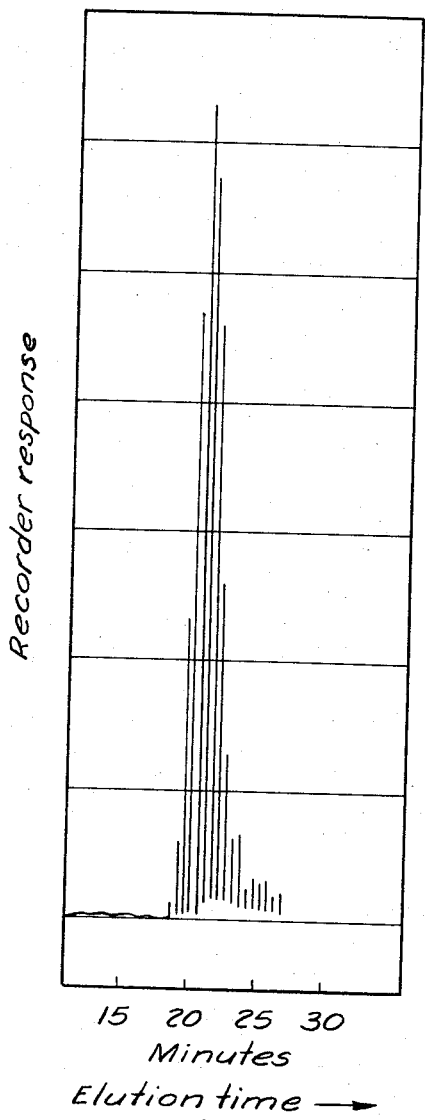

A gel permation chromatographic assembly having the arrangement of FIGURE 1 was constructed. The second bellows 20 is filled with about 20 milliliters of tetrahydrofuran. The sample loop 29 is filled with a sample solution consisting of a 1 percent by weight solution of polystyrene having a weight average molecular weight of 155,000 as determined in an ultra centrifuge. The column 35 is 5.5 feet in length of polytetrafluoroethylene tubing having an inside diameter of 0.022 inch. The column is packed with a porous polymer of about 90 weight percent styrene and about 10 weight percent divinyl benzene in the form of beads having diameters ranging from about 30 to about 50 microns. The gel had a porosity rating of $10^4$ Angstroms. The porosity rating in is acocrdance with that described in the Polymer Preprints of the Chicago American Chemical Society meeting of September 1964 on pages 7, 120, by L. E. Maley. The discharge end of the column is positioned about ¼ inch from a 45 mesh (U.S. sieve size) circular platinum gauze wheel 2.5 inches in diameter. The gauze wheel was centrally supported in horizontal position and driven by a synchronous motor which rotated the wheel at a speed of 12 r.p.m. Nitrogen under pressure of 65 pounds per square inch is applied to the first bellows 14 causing the tetrahydrofuran to flow from the second bellows 20 through the packed column at a rate of about 0.5 milliliter per hour. The valve 24 is rotated to connect the sample loop 29 with the column and the second bellows to the sample loop for a period of 20 seconds and the valve returned to the position shown in FIGURE 1. To permit transfer of an aliquot of the samples to the column, the aliquot is then forced through the column by the tetrahydrofuran from the second bellows. The effluent from the column is deposited as a plurality of droplets on the platinum gauze wheel. The tetrahydrofuran is evaporated and the remaining non-volatile polystyrene carried into the hydrogen flame of a flame detector and recorded. FIGURE 2 shows the result. Higher molecular weight fractions appear first and are indicated on the left of the figure.

*Example 2*

Figure 3:
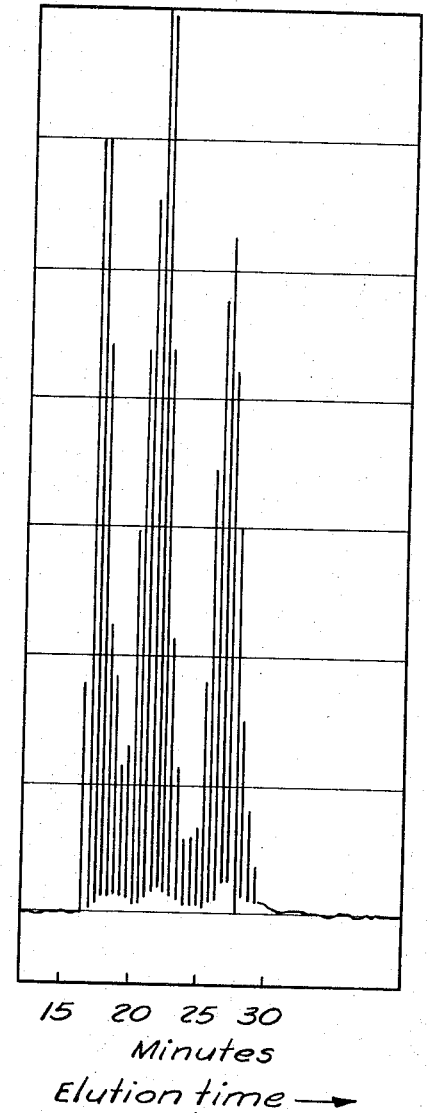
Figure 4:
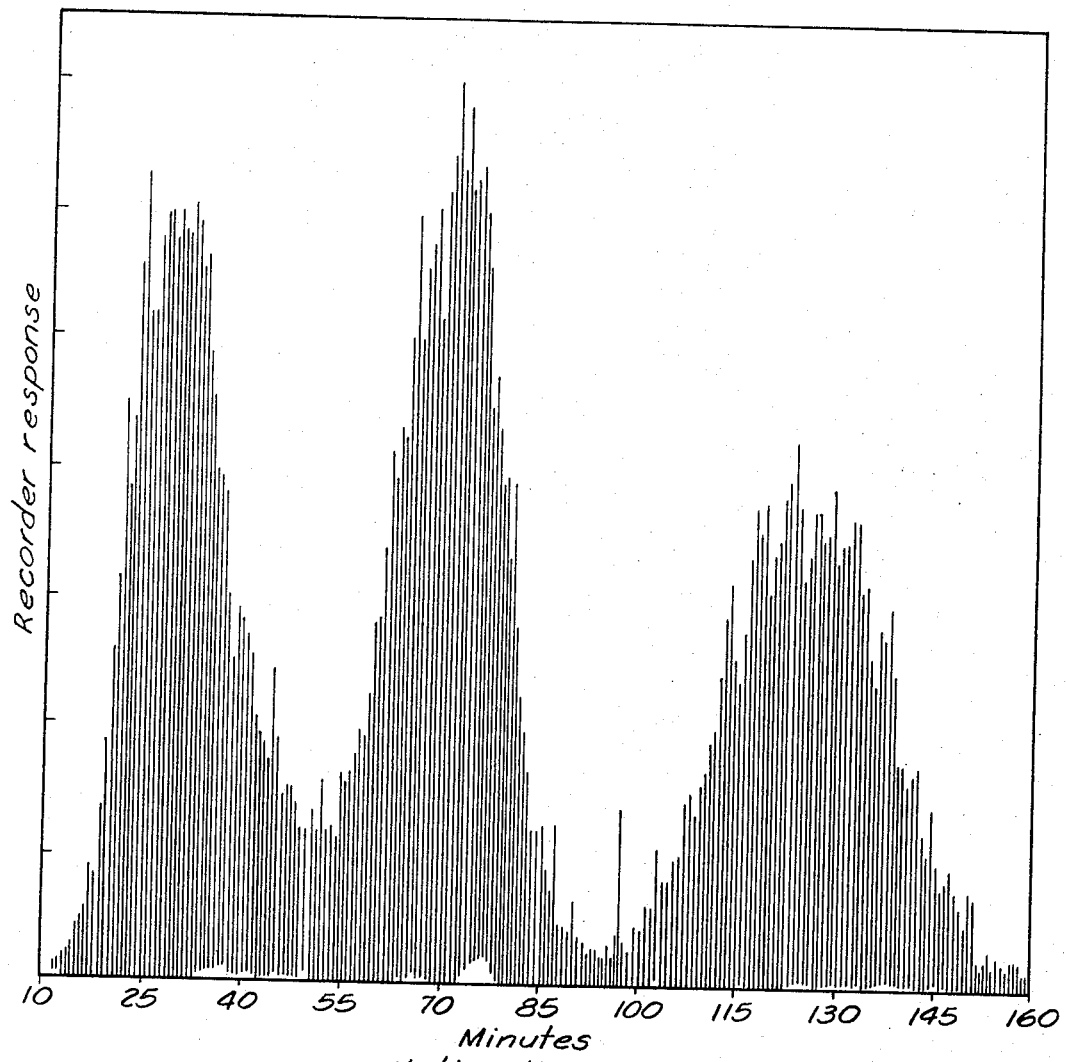

The procedure of Example 1 was repeated with the exception that a mixture of equal weights of three narrow molecular weight distribution polystyrenes having weight average molecular weights of 568,000, 82,000 and 10,500 were employed. The aliquot employed was obtained by connecting the sample loop for a period of 60 seconds. The chromatogram obtained from a recorder is shown in FIGURE 3.

*Example 3*

The procedure of Example 1 was repeated with the exception that the column was 8 feet in length and had an inside diameter of ¹⁄₁₆ of an inch. The flow rate was approximately 1.6 milliliters per hour and the sample aliquot from the loop was obtained by opening the valve for 3 minutes. The apparatus was operated for a period of 150 minutes and the chromatogram is shown in FIG- URE 4. The mixed polystyrenes of Example 2 were employed.

By utilizing conventional calculation and known samples, a computer program is readily set up which permits calibration of a column for a given polymer to determine absolute molecular weight distributions. Conveniently, such standard samples may readily be calibrated by means of ultracentrifuge and the like.

*Example 4*

Figure 5:
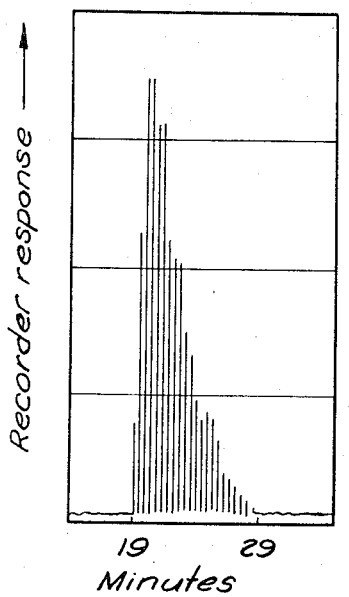

Employing the apparatus and general procedure of Example 1 and tetrahydrofuran as a solvent, a 1 percent solution of polybutadiene was injected into the column for a period of 30 seconds. The polymer was detected by the flame detector after 19 minutes wherein the higher molecular weight fraction was detected. The lower molecular weight polymer was eluted after 29 minutes. FIGURE 5 shows the recorder response of the experiment.

*Example 5*

Figure 6:
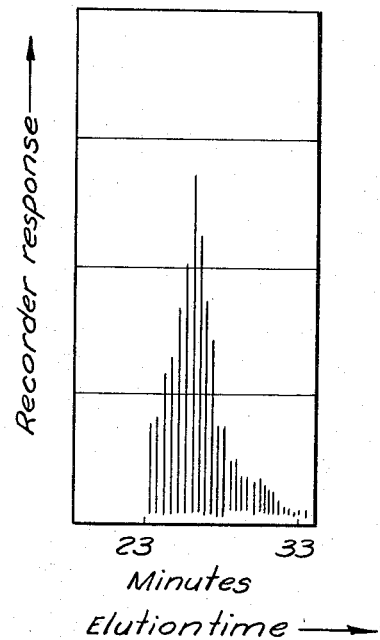

In a manner similar to Example 4, the copolymer of about 85 weight percent vinylidene chloride and 15 weight percent vinyl chloride was determined by injecting into the column for a period of 42 seconds a 1 percent solution of the copolymer and tetrahydrofuran was employed. After 23 minutes, the high molecular weight fraction had reached the flame detector, whereas the low molecular weight was discharged after about 33 minutes. FIGURE 6 shows the recorder response of the experiment.

*Example 6*

Figure 7:
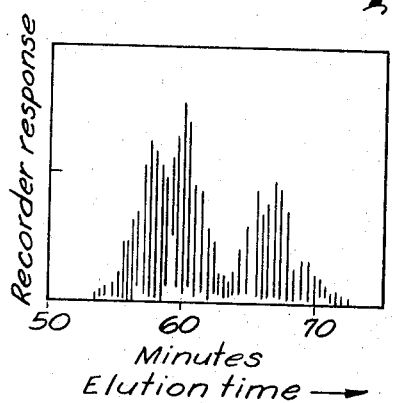

The apparatus of FIGURE 1 was modified to provide a 2.5 foot long column having an inside diameter of $1/16$ of an inch. The porous beads employed had a porosity of $10^2$. The solvent employed both in the bellows and for the samples is methylene chloride. The sample comprised a 1 weight percent solution of epoxidized soybean oil, 4.5 weight percent tributylacetyl citrate and 0.7 weight percent tertiarybutyl salol. The solution was injected for a period of 30 seconds. After a period of 52 minutes, the components started to emerge from the column and the results are shown in FIGURE 7. The three peaks reading from left to right represent the epoxidized soy bean oil, acetyltributyl citrate and tertiarybutyl salol.

Similar advantageous and beneficial results are obtained employing polymers of vinyl chloride, chloromethylated diphenyloxide, polyethylene oxide, polymers of vinylidene chloride, copolymers of styrene and butadiene, condensation products of ethylenediamine and adipic acid, polyethylene and the like. Beneficially, in instances where the polymer solubility is low at room temperature, the smaller size of the apparatus readily permits jacketing of the column and sample loop to provide operation at elevated temperatures.

The method and apparatus of the present invention are readily employed for the separation of nonvolatile material in a volatile solvent. The terms "non-volatile" and "volatile" are relative. The volatile material must have a vapor pressure sufficient to evaporate prior to the sample reaching the flame of the flame detector and the non-volatile material must have a vapor pressure sufficiently low that it is not vaporized prior to reaching the flame detector. Thus, the method and apparatus of the present invention are particularly suited for material which have a vapor pressure sufficiently low that they cannot be analyzed conveniently by gas chromotographic techniques under ambient temperature conditions.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. In a gel permeation chromatographic method wherein a high molecular weight material to be analyzed is dissolved in a solvent to form a solution, the solution is passed through an elongate body of microporous polymer which is insoluble in the solution, and effluent removed from the elongate body and the quantity of material present within successive portions of the effluent determined, the improvement which comprises employing an elongate body of a microporous polymer having a diameter from about 0.01 to about 0.125 inch, depositing effluent from the body upon a perforate inert metal support capable of retaining effluent, evaporating at least a major portion of solvent in the effluent from the support, moving a portion of the support upon which the effluent is deposited into a flame of a flame ionization detector and recording the response of the detector.

2. The method of claim 1 wherein the solution is passed into the elongate porous body through a conduit approximating the dimension of the inside diameter of the elongate body.

3. The method of claim 1 wherein the elongate body has a diameter of 0.01 to 0.08 inch.

4. The method of claim 1 including the step of determining the rate of flow of the solution through the elongate body prior to the introduction of an aliquot into the elongate body.

5. The method of claim 4 wherein the effluent is deposited in a dropwise manner upon the inert metal support.

6. The method of claim 1 wherein the high molecular weight material is a resin.

7. The method of claim 6 wherein the high molecular weight material is a synthetic resinous material.

8. The method of claim 7 wherein the synthetic resinous material is polystyrene.

9. The method of claim 1 wherein the perforate metal support comprises a rotating platinum gauze wheel.

10. A gel permeation chromatographic apparatus comprising in cooperative combination
    means to provide an effluent from a gel permeation chromatographic column
    having an inside diameter from about 0.01 to 0.125 inch,
    a perforate inert metal body having perforations of sufficient size to retain a drop of effluent liquid thereon and arranged to receive effluent from the column,
    means to provide a flame and being disposed adjacent to the perforate metal body,
    means to evaporate volatile liquid from a drop of the effluent liquid deposited on the metal body,
    means to position a portion of the metal body having volatile liquid evaporated therefrom within the flame,
    means to detect combustion products of the non-volatile material component of the effluent deposited upon the perforate body, and
    means to detect the combustion products and being positioned to receive gases from the flame.

11. The apparatus of claim 10 including means to provide a solvent to the chromatographic column at a constant rate of flow.

12. The apparatus of claim 11 wherein the chromatographic column comprises a hollow cylindrical body having an inside diameter of from about 0.01 to 0.08 inch and a length of at least 2.5 feet packed with a plurality of microporous polymer particles.

13. The apparatus of claim 10 wherein the means to detect combustion products is an ionization flame detector.

14. The apparatus of claim 13 including an electrometer amplifier and recorder in cooperation with the ionization flame detector.

15. The apparatus of claim 10 including a solvent supply means and valving means to introduce a predetermined aliquot of a sample into the column.

16. The apparatus of claim 10 wherein the perforate metal support is a platinum screen.

17. The apparatus of claim 16 wherein the platinum screen has a circular configuration.

18. The apparatus of claim 17 including means to rotate the circular configuration.

References Cited

UNITED STATES PATENTS

| | | | |
|---|---|---|---|
| 3,158,446 | 11/1964 | Sternberg et al. | 23—232 X |
| 3,215,499 | 11/1965 | Dewar et al. | 23—232 X |
| 3,303,002 | 2/1967 | McAuliffe | 23—232 X |

REUBEN FRIEDMAN, *Primary Examiner.*

J. L. DE CESARE, *Assistant Examiner.*